(12) United States Patent
Millar

(10) Patent No.: US 10,681,880 B2
(45) Date of Patent: Jun. 16, 2020

(54) SYSTEMS AND METHODS FOR USING WATER AS A BALLAST IN AN ASSEMBLY LINE GROW POD

(71) Applicant: Grow Solutions Tech LLC, Lehi, UT (US)

(72) Inventor: Gary Bret Millar, Highland, UT (US)

(73) Assignee: Grow Solutions Tech LLC, Vineyard, UT (US)

( * ) Notice: Subject to any disclaimer, the term of this patent is extended or adjusted under 35 U.S.C. 154(b) by 223 days.

(21) Appl. No.: 15/983,755

(22) Filed: May 18, 2018

(65) Prior Publication Data

US 2018/0359972 A1    Dec. 20, 2018

Related U.S. Application Data

(60) Provisional application No. 62/519,411, filed on Jun. 14, 2017.

(51) Int. Cl.
| | |
|---|---|
| *A01G 31/00* | (2018.01) |
| *A01G 31/04* | (2006.01) |
| *A01G 31/06* | (2006.01) |
| *A01G 9/24* | (2006.01) |
| *A01G 7/04* | (2006.01) |
| *A01G 7/06* | (2006.01) |
| *A01G 9/26* | (2006.01) |

(52) U.S. Cl.
CPC ........... *A01G 31/042* (2013.01); *A01G 9/247* (2013.01); *A01G 31/06* (2013.01); *A01G 7/045* (2013.01); *A01G 7/06* (2013.01); *A01G 9/26* (2013.01)

(58) Field of Classification Search
CPC ....... A01G 31/00; A01G 31/04; A01G 31/042
USPC ............................................................. 47/17
See application file for complete search history.

(56) References Cited

U.S. PATENT DOCUMENTS

| | | | |
|---|---|---|---|
| 6,035,578 A | 3/2000 | Lo | |
| 8,234,814 B2 * | 8/2012 | Kertz | A01G 9/024 47/67 |

(Continued)

FOREIGN PATENT DOCUMENTS

| | | |
|---|---|---|
| CN | 102487806 B | 7/2014 |
| FR | 2739252 B1 | 2/2001 |

(Continued)

OTHER PUBLICATIONS

International Search Report and Written Opinion for PCT/US2018/033839 dated Nov. 28, 2018, 16 pages.

*Primary Examiner* — Richard T Price, Jr.
(74) *Attorney, Agent, or Firm* — Dinsmore & Shohl LLP

(57) ABSTRACT

A method for controlling a balanced state of an assembly line grow pod is provided. A group of sensors including a pressure sensor and a weight sensor is arranged at a plurality of different locations of an assembly line grow pod. A first set of data indicative of weight of fluid supplied to plants supported in an assembly line grow pod is generated. A second set of data indicative of weight of plants grown is generated. Based on the first set of data and the second set of data, a weight disparity at a selected location of the assembly line grow pod is determined. Upon determination that the weight disparity exceeds a predetermined threshold, the balanced state of the assembly line grow pod is maintained by moving ballast water to reduce the weight disparity.

20 Claims, 5 Drawing Sheets

(56) References Cited

U.S. PATENT DOCUMENTS

| | | | |
|---|---|---|---|
| 8,453,380 B1 * | 6/2013 | Helder | B65G 17/20 47/67 |
| 8,984,806 B2 * | 3/2015 | Uchiyama | A01G 9/24 47/17 |
| 9,433,160 B2 | 9/2016 | Soohoo | |
| 9,516,822 B2 | 12/2016 | Gonyer | |
| 2013/0019527 A1 | 1/2013 | Howe-Sylvain | |
| 2014/0259919 A1 | 9/2014 | Halmos | |
| 2018/0007845 A1 | 1/2018 | Martin | |

FOREIGN PATENT DOCUMENTS

| | | |
|---|---|---|
| GB | 2121263 A | 12/1983 |
| WO | 2013/066254 A1 | 5/2013 |
| WO | 2017/062918 A1 | 4/2017 |

\* cited by examiner

SYSTEMS AND METHODS FOR USING WATER AS A BALLAST IN AN ASSEMBLY LINE GROW POD

CROSS REFERENCE

This application claims the benefit of U.S. Provisional Application Ser. No. 62/519,411, filed on Jun. 14, 2017, which is incorporated by reference in its entirety.

TECHNICAL FIELD

The present disclosure relates to systems and methods for maintaining a balanced state of an assembly line grow pod and, more specifically, to systems and methods for maintaining a balanced state of the assembly line grow pod by using water as ballast in various portions of the assembly line grow pod.

BACKGROUND

While crop growth technologies have advanced over the years, there are still many problems in the farming and crop industry today. As an example, while technological advances have increased efficiency and production of various crops, many factors may affect a harvest, such as weather, disease, infestation, and the like. Additionally, while the United States currently has suitable farmland to adequately provide food for the U.S. population, other countries and future populations may not have enough farmland to provide the appropriate amount of food.

Accordingly, there is a need to provide an organized plant grow pod system which facilitates a quick growing, small footprint, chemical free, low labor solution to growing microgreens and other plants for harvesting. At the same time, there is a need that the organized plant grow pod system may provide controlled and optimal environmental conditions (e.g., the timing and wavelength of light, pressure, temperature, watering, nutrients, molecular atmosphere, and/or other variables) in order to maximize plant growth and output. In particular, it is important to monitor and check growth patterns and growth status of plants or seeds in order to provide individual and customized care for each plant or seed and take proper measure for plants or seeds experiencing growth problems.

The organized plant grow pod system may encounter weight disparity. For example, the organized plant grow pod houses a large number of plants and seeds in a compact space. Plants and seeds have different and quite diverse watering needs. In addition, plants and seeds grow at their own pace and some plants reach maturity much faster than other plants. Mature plants tend to have more increased weight than plants at their early growth stage. In some situations, a large amount of fluid including watering may be directed to a particular location of the organized plant grow pod and the particular location may experience weight surge. Moreover, if there may have plants at their maturity and/or high population of plants having higher fluid need, the weight of such location may significantly increase. Such concentration of fluid supply and the increased weight of matured plants may result in a weight disparity in the organized plant grow pod.

The weight disparity of the organized plant grow pod may affect stability of the grow pod and cause damage to one or more components thereof. Additionally or alternatively, the weight disparity of the plant grow pod may make the plant grow pod or one or more components thereof susceptible to damage.

Therefore, there is a need to monitor and maintain a balanced state of various portions of the organized plant grow pod to avoid malfunction or incorrect functioning.

SUMMARY

Systems and methods for controlling a balanced state of an assembly line grow pod are described. One embodiment of a system for controlling a balanced state of an assembly line grow pod includes a plurality of carts carrying plants, seeds, or both, a plurality of fluid holding tanks, pressure sensors, a ballast tank and a ballast controller. The plurality of fluid holding tanks is arranged in an assembly line grow pod and for supplying fluid to the plants and the seeds. The pressure sensors are arranged in association with the fluid holding tanks. The ballast tank is fluidly connected to the fluid holding tanks and for holding ballast water. The ballast controller is coupled to the ballast tank and operable to determine a balanced state of the assembly line grow pod. The ballast controller is operable to (i) receive from the pressure sensors a first set of data indicative of the weight of the fluid, (ii) receive a second set of data indicative of weight of plants grown, (iii) determine the balanced state of the assembly line grow pod, based on the first set of data and the second set of data, at a selected location of the assembly line grow pod, and (iv) maintain the balanced state of the assembly line grow pod by moving a flow of the ballast water between the ballast tank and the selected location In another embodiment, an assembly line grow pod system includes a grow pod structure, a first fluid holding tank, a second fluid holding tank, and a ballast control system. The grow pod structure includes a first tower structure and a second tower structure and supporting a plurality of carts carrying plants, seeds, or both. The first fluid holding tank is associated with the first tower structure and contains fluid to be supplied to the plants and the seeds arranged in the first tower structure. The second fluid holding tank is associated with the second tower structure and containing fluid to be supplied to the plants and the seeds arranged in the second tower structure. The ballast control system is communicatively coupled to the first fluid holding tank and the second fluid holding tank. The ballast control system includes a ballast controller, a first ballast tank communicatively coupled to the ballast controller, and a second ballast tank communicatively coupled to the ballast controller. The ballast controller is operable to (i) determine a balanced state of the first tower structure and the second tower structure based on first weight information including weight of the first fluid holding tank and weight of the plants arranged in the first tower structure and based on second weight information including weight of the second fluid holding tank and weight of the plants arranged in the second tower structure, and (ii) maintain the balanced state of the assembly line grow pod by directing a flow of fluid between the first fluid holding tank and the first ballast tank, a flow of fluid between the second fluid holding tank and the second ballast tank, or both.

In yet another embodiment, a method for controlling a balanced state of an assembly line grow pod is provided. A group of sensors including a pressure sensor and a weight sensor is arranged at a plurality of different locations of an assembly line grow pod. A first set of data indicative of weight of fluid supplied to plants supported in an assembly line grow pod is generated. A second set of data indicative of weight of plants grown is generated. Based on the first set of data and the second set of data, a weight disparity at a selected location of the assembly line grow pod is determined. Upon determination that the weight disparity exceeds a predetermined threshold, the balanced state of the assembly line grow pod is maintained by moving ballast water to reduce the weight disparity.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for monitoring, determining and maintaining a balanced state of various portions of an assembly line grow pod. More specifically, the embodiments discussed herein may use water as ballast and maintain a balance within various portions of an assembly line grow pod. Accordingly, the balanced state of the assembly line grow pod may be maintained.

Some embodiments are configured with an assembly line grow pod having an assembly line of trays holding seeds and/or plants that follow a track. The track wraps around a first axis in a vertically upward direction and wraps around a second axis in vertically downward direction. These embodiments may utilize the assembly line grow pod having various components that provide customized water, nutrients, and environmental conditions (e.g., air composition/pressure) to individual cells that hold those seeds and/or plants. To ensure that the assembly line grow pod remains balanced as the seeds and/or plants move throughout, water may be utilized as ballast to maintain such a balance. Ballast water is provided for correcting and maintaining a balance state of the assembly line grow pod.

The systems and methods for maintaining a balanced state of an assembly grow pod include a ballast control system for controlling a balance of water in an assembly line grow pod. The ballast control system is coupled to a ballast water tank and determines distribution of ballast water to and from the ballast water tank based on a balanced state of the assembly line grow pod. The systems and methods for maintaining a balance of water that incorporate the same will be described in more detail, below.

Figure 1:
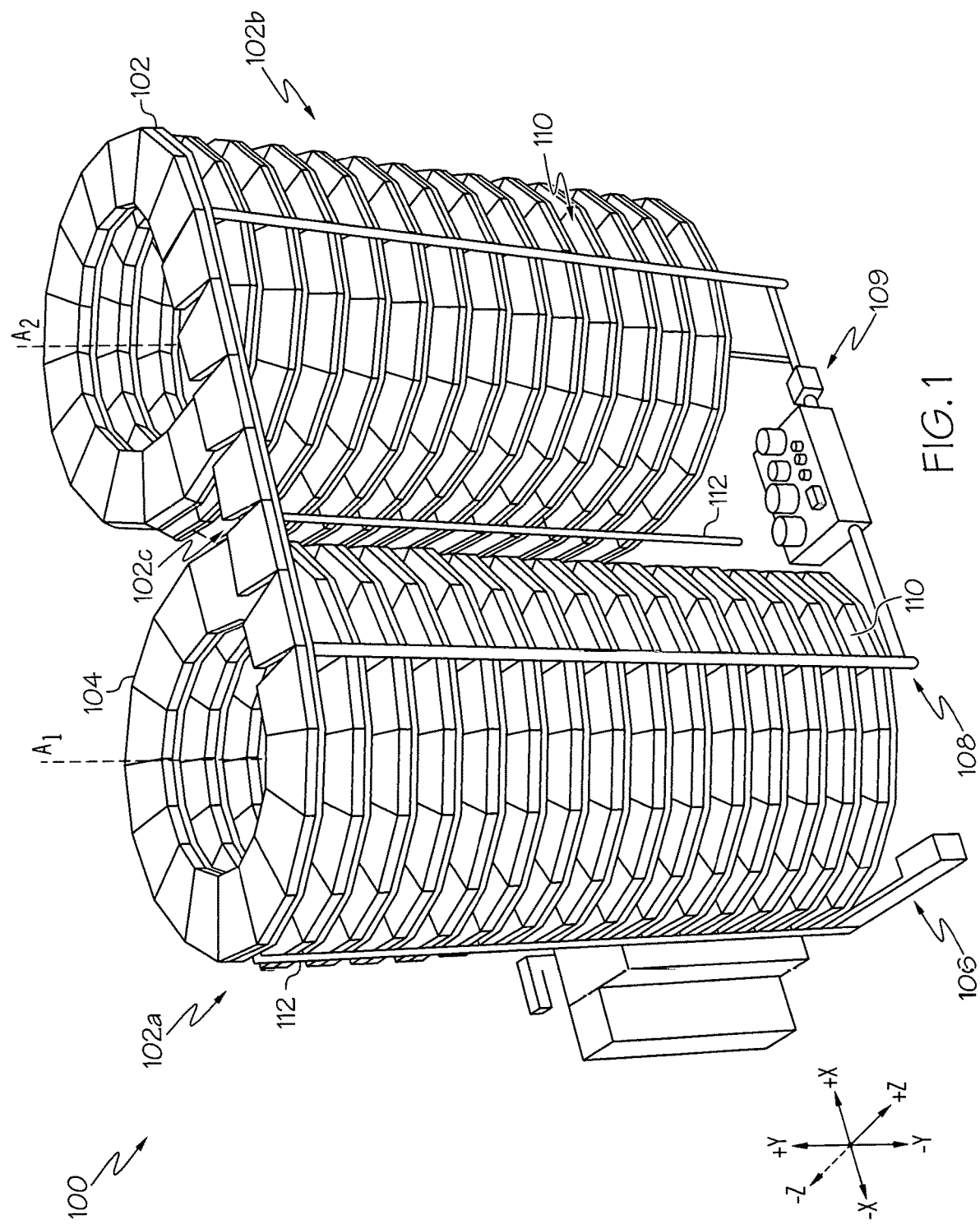
FIG. 1 schematically depicts a perspective view of an illustrative assembly line grow pod according to one or more embodiments shown and described herein.

Referring now to the drawings, FIG. 1 depicts one embodiment of an assembly line grow pod 100. The assembly line grow pod 100 may include a track 102 that holds one or more carts 104. Each of the one or more carts 104 supports one or more trays 105 thereon. The track 102 may include an ascending portion 102a, a descending portion 102b, and a connection portion 102c. In FIG. 1, the track 102 may wrap around in a counterclockwise direction around a first axis such that the carts 104 ascend upward in a vertical direction. In other embodiments, clockwise or other configurations of the track 102 are available. The connection portion 102c of the track 102 may be relatively level and is utilized to transfer carts 104 to the descending portion 102b. Alternatively, the connection portion 102c may not be level in other embodiments. The descending portion 102b may be wrapped around a second axis, again in a counterclockwise direction as shown in FIG. 1. The second axis is substantially parallel to the first axis such that the carts 104 may be returned closer to ground level.

The assembly line grow pod 100 is coupled to a master controller 106 as shown in FIG. 1. The master controller 106 may include various components that control particular portions of the assembly line grow pod 100. For example, the master controller 106 may control various environmental conditions within the assembly line grow pod 100, such as light, temperature, humidity, and/or the like. In another example, the master controller 106 may control fluid flow throughout the assembly line grow pod 100, such as components that control valves, pumps, and/or the like, as described herein.

In some embodiments, the master controller 106 may store a master recipe for plants that may dictate the timing and wavelength of light, pressure, temperature, watering, nutrients, molecular atmosphere, and/or other variables that optimize plant growth and output. For example, the master recipe dictates lighting requirements on the third day of a particular plant at the assembly line grow pod 100, different lighting requirements on the fourth day of the plant, etc. As another example, the master recipe dictates watering needs, nutrient feeds, etc. directed to plants carried on the carts at particular locations for a particular day counted from the date that plants are introduced into the assembly line grow pod 100. The master recipe is specific, extensive and customized to cover plants supported by the assembly line grow pod 100. By way of example only, the recipe may have instructions to assist 1500 carts simultaneously operating in the assembly line grow pod 100 and carrying diverse population of plants. In some embodiments, the master controller 106 may store specific recipes such as a watering recipe, a nutrient recipe, a dosage recipe, a wave recipe, a temperature recipe, a pressure recipe, etc.

In some embodiments, the master recipe may take any form of a structured set of data, a database, etc. such that data is organized into rows, columns, and table. Additionally or alternatively, the master recipe may be structured to facilitate the storage, retrieval, modification, addition, and deletion of data through data processing operations.

In some embodiments, the master controller 106 reads information from the master recipe and adjusts the information based on known locations of plants at the assembly line grow pod 100. For example, the master controller 106 may identify the plants' location based on a cart identifier which is indicative of the growth stage of the plants in the assembly line grow pod 100. Once plants enter into the assembly line grow pod 100, plants move along the spiral tracks from the ascending side to the descending side until plants arrive at the harvest stage. Thus, the location of the carts carrying plants may indicate the growth stage of plants at the assembly line grow pod 100. Then, the master controller 106 may apply the master recipe relevant to the stage of the plants, such as lighting, watering, pressure, and/or wave requirements, specific to plants growing on the fourth day at the assembly line grow pod 100.

The master controller 106 processes the master recipe and controls various components of the assembly line grow pod 100. To reduce the processing load, for example, processing the master recipe and all related events for a large number of simultaneously operating carts carrying the diverse population of plants, the master controller 106 may distribute different and specific functions to several control modules, such as a valve controller, a dosage controller, a pump controller, etc. These control modules work autonomously, complete task(s) and report to the master controller 106. In some embodiments, the control modules may be configured as hardware modules with their own set of instructions in order to improve stability and avoid pushed updates and modifications. In other embodiments, other configurations of the control modules are available.

For example, the master controller 106 may work with a valve control module (not shown) which provides control signals to one or more valves 108 and/or receive status signals from the valves 108. Based on these signals, the valve control module can effectively direct the valves 108 to direct fluid to any locations within the assembly line grow pod 100. For example, certain ones of the valves 108 may be fluidly coupled to one or more water lines 110 and may direct water and/or nutrients via the water lines 110 by opening or closing accordingly. Upon completion of tasks, the valve control module sends out a notification to the master controller 106 which in turn updates the relevant information and status.

In another example, the master controller 106 may work with a pump control module (not shown) that provides control signals to one or more pumps 109 and/or receive status signals from the pumps 109. Based on these control signals, the pump control module can effectively direct the pumps 109 to pump fluid to any locations within the assembly line grow pod 100. Upon completion of tasks, the pump control module sends out a notification to the master controller 106 which in turn updates the relevant information and status.

The water lines 110, in conjunction with the valves 108 and/or the pumps 109, may distribute water and/or nutrients to one or more trays 105 at particular areas of the assembly line grow pod 100 when such water and/or nutrients are pumped by the pumps 109. In some embodiments, the valves 108 may also be fluidly coupled to fluid distribution manifolds that distribute the water and/or nutrients via the water lines 110 such that the amount of fluid that enters the fluid distribution manifolds is controlled by opening or closing the valve 108 and thereby control the pressure of the fluid within the fluid distribution manifolds. In some embodiments, seeds may be sprayed to reduce buoyancy and then flooded. Additionally, water usage and consumption may be monitored, such that, at subsequent watering stations, this data may be utilized to determine an amount of water to apply to a seed at that time, and control of the water may be at least partially completed by the one or more valves.

It should be understood that while the embodiment of FIG. 1 depicts an assembly line grow pod 100 that wraps around a plurality of axes, this is merely one example. The embodiments of the present disclosure are discussed using two towers structure of the assembly line grow pod 100 but the present disclosure is not limited thereto. In other embodiments, four towers structure of the grow pod is available. Any configuration of assembly line or stationary grow pod may be utilized for performing the functionality described herein.

In some embodiments, various components of the assembly line grow pod 100 may include sensors that detect information relating to plants, seeds, or both with respect to their growth state, their location, contamination, any other factor affecting the assembly line grow pod 100, or its components. For example, weight sensors may be provided to detect weight of plants, weight of payload of carts, etc. The weight sensors may be arranged on the carts, tracks, or at any location suitable for detecting weight of plants. By way of example, the weight sensors may be arranged on the carts to detect weight of plants. As another example, the weight sensors may be located on the tracks. Weight information detected by the weight sensors arranged on the tracks may be provided to the master controller 106. The master controller 106 subtracts the weight of carts from the weight information and determines the weight of plants. In some embodiments, the weight of plants may be used to determine a balanced state of the assembly line grow pod. In other embodiments, the weight of plants may be used for other purposes, such as determining a growth state of plants, tracking a location of seeds, or plants on a tray, determining a location of carts, etc.

In other embodiments, the master controller 106 may estimate the weight of plants grown. When a particular cart 104 enters into the assembly line grow pod 100, the weight of the particular cart 104 carrying a tray holding seeds at the entry point may be estimated based on the known weight of the cart 104 and the known weight of the tray as well as the amount of seeds known to the system. The master controller 106 contains the master recipe that dictates the amount of fluid to be supplied to seeds and plants. Thus, the amount of fluid supplied to seeds and plants may be known. Based on the set of known information, the master controller 106 may measure a weight of the cart 104 at the harvesting point. For example, the car 104 may stay at a harvesting station before harvesting takes place. This information may enable the master controller 106 to estimate the weight of growing plants. Furthermore, this information also may enable the master controller 106 to estimate the weight of carts 104 or the weight of the payload at various portions of the assembly line grow pod 100.

Figure 2:
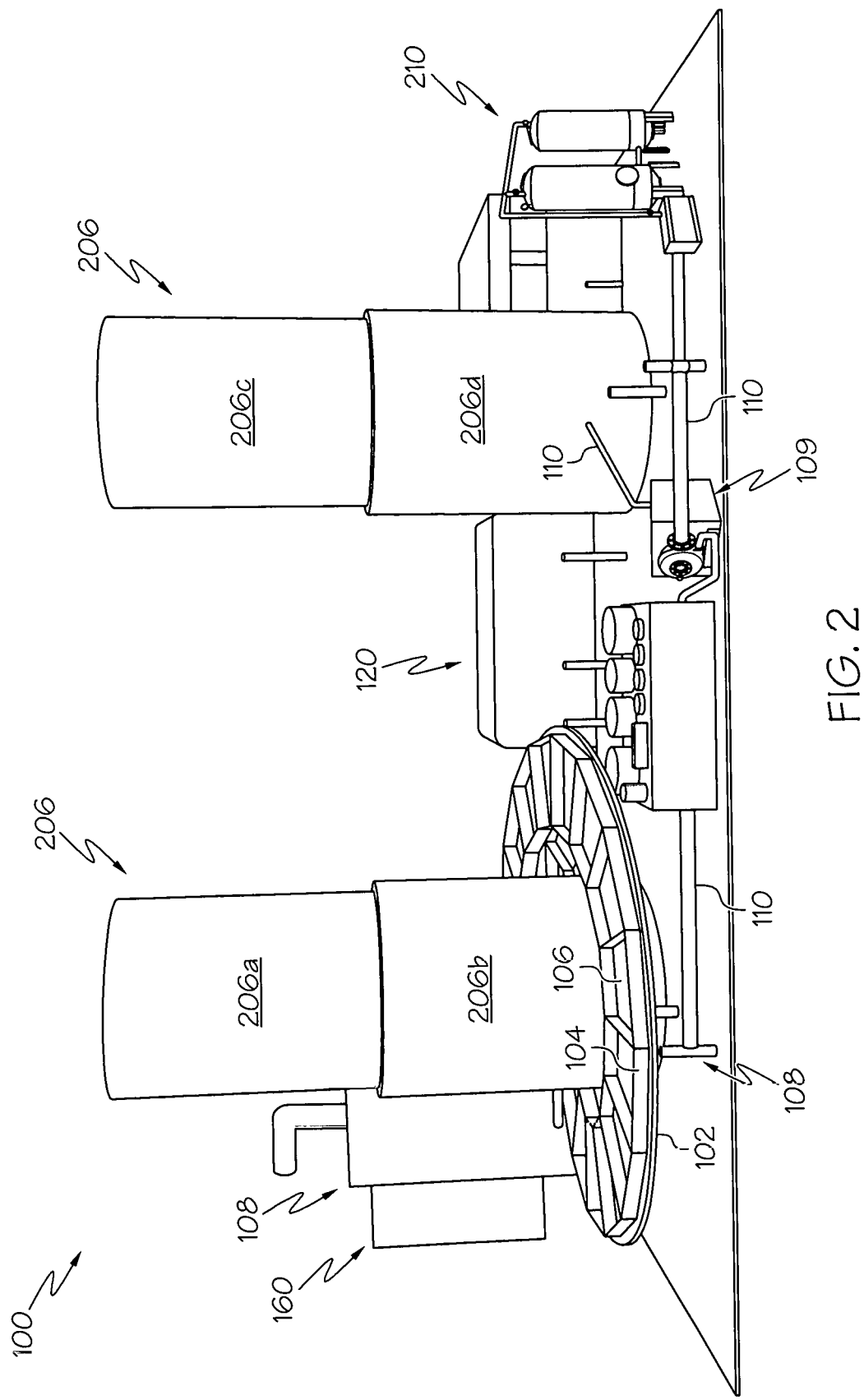
FIG. 2 depicts a plurality of illustrative components for an assembly line grow pod according to embodiments shown and described herein.

FIG. 2 depicts a plurality of components for the assembly line grow pod 100 having two towers structure, with the track 102 as shown FIG. 1 being removed for illustrative purposes only. Referring to both FIGS. 1 and 2, the valves 108, one of the pumps 109, and the water lines 110 are illustrated, as well as a plurality of fluid holding tanks 206 and a ballast control system 210. As described above, each one of the valves 108 may be configured to direct various fluids to distribution points (e.g., fluid distribution manifolds) for application to the trays 105 of the carts 104 and/or direct air to the assembly line grow pod 100 or portions thereof.

As the plants are watered and provided with nutrients, the carts 104 will traverse the track 102 of the assembly line grow pod 100. Additionally, the assembly line grow pod 100 may detect a growth and/or fruit output of a plant and may determine when harvesting is warranted. If it is determined that the plants on a cart 104 are ready for harvesting, a harvester component (not shown) of the assembly line grow pod 100 may facilitate such a harvesting process.

Once the cart 104 and the tray 105 are clear of plant material (i.e., after harvesting has occurred), a sanitizer component 120 of the assembly line grow pod 100 may be implemented to remove any particulate, plant material, etc. that may remain on the cart 104. As such, the sanitizer component 120 may implement any of a plurality of different washing mechanisms, such as high pressure water, high temperature water, and/or other solutions for cleaning the cart 104 and/or tray 105. Fluid provided to the sanitizer component 120 may be directed by the valves 108.

As previously described herein, various components described herein utilize fluid, including water, nutrients, air, and/or the like. The fluid holding tanks 206 may provide and distribute such fluid via the valves 108, the pumps 109, and the water lines 110, as needed. The fluid holding tanks 206 include a cycled water portion 206a, a gray water portion 206b, a nutrient water portion 206c and a treated water portion 206d. For example, if the sanitizer component 120 requires water to wash the cart 104 and/or the tray 105, a treated water portion 206d of the fluid holding tanks 206 provides water to the sanitizer component 120 via the valves 108 which may control movement of the fluid. Gray water contained in the gray water portion 206b is also cleaned and recycled water.

While FIGS. 1 and 2 depict the various valves 108, pumps 109, and water lines 110 as being located in a particular location within the assembly line grow pod 100, such location are merely illustrative. Each one of the valves 108, pumps 109, and water lines 110 may be located at any location within the assembly line grow pod 100, particularly locations that are fluidly coupled between a fluid source (e.g., the fluid holding tanks 206) and a fluid distribution point (e.g., a fluid distribution manifold, a water tap in the sanitizer, etc.). In some embodiments, a single valve 108, a single pump 109, and/or a single water line 110 may be located between a fluid source and a fluid distribution point. In other embodiments, a plurality of valves 108, pumps 109, and/or water lines 110 may be located between the fluid source and the fluid distribution point for the purposes of allowing fluid to be redirected on the fly as needed, to allow the fluid to pressurize, to ensure a balance of fluid, and/or the like.

The fluid holding tanks 206 include pressure sensors 220, 230 arranged therein. The pressure sensors 220 may detect data relating to fluid volume, pressure, etc. Based on fluid volume and pressure, the weight of the fluid holding tanks 206 may be determined. For instance, when a large amount of water has been supplied from the cycled water portion 206a, the pressure sensor 220 may detect low pressure and low weight of the cycled water portion 206a. Similarly, when a large amount of nutrient has been supplied from the nutrient water portion 206c, the pressure sensor 230 may detect low pressure and low weight of the nutrient water portion 206c. The master controller 206 determines the amount of fluid based on the master recipe and controls dosage supply control components directly, or indirectly to supply the amount of fluid. Thus, at a certain point, the master controller 206 may determine a distribution state of fluid across the entire assembly line grow pod. For example, the master controller 106 may determine that the fluid holding tank 206a has a lower level of fluid as opposed to the fluid holding tank 206c. As another example, the master controller 106 may determine that a large amount of fluid has been supplied to an upper track of the left side tower 104.

Figure 3:
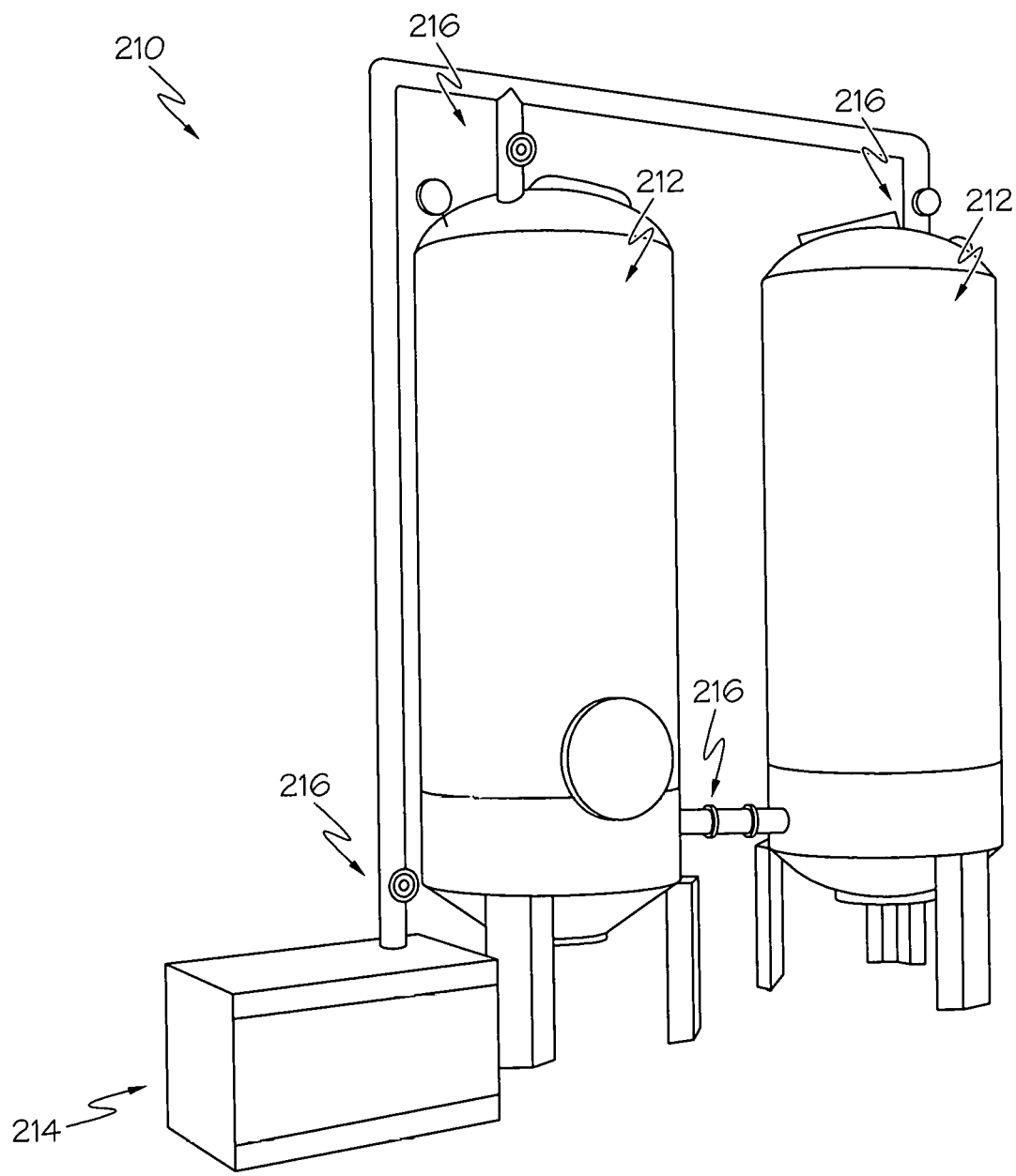
FIG. 3 depicts an illustrative ballast control system according to one or more embodiments shown and described herein.

In other embodiments, sensors such as pressure sensors may be arranged at multiple locations throughout the assembly line grow pod 100. By way of example, the pressure sensors may be arranged at the fluid distribution point, such as a fluid distribution manifold, a water tap in the sanitizer component 120, or any suitable location for detecting fluid pressure and volume. The pressure sensors may detect data relating to fluid volume and pressure and send the data to the master controller 106, or a ballast control system 210 as shown in FIGS. 2 and 3. A set of data relating to fluid pressure and volume and weight of plants growth may be used to monitor and maintain a balanced state of multiple locations throughout the assembly line grow pod 100.

Concentrated supply of fluid may impact the weight imposed on the structure of the assembly line grow pod 100. As shown in FIG. 1, the assembly line grow pod 100 has a two towers structure with a right tower structure 102 and a left tower structure 104. As one example, if the left tower 104 of the assembly line grow pod 100 has an event of concentrated supply of fluid, the right tower 102 of the assembly line grow pod 100 may experience much lighter weight. Additionally, the weight of plants grown may impose another factor to contribute to the weight disparity. The weight of plants changes as plants grow. Specifically, as plants become mature, the weight of plants tends to increase. The change of weight may take place at various locations of the assembly line grow pod 100.

As the assembly line grow pod 100 has a large number of carts simultaneously operating and carrying a large population of plants, the weight of maturing plants may result in significant increase in the overall weight imposed on the assembly line grow pod 100. In some embodiments, the weight of plants may result in weight disparity between the right tower structure 102 and the left tower structure 104. For instance, most of the plants disposed on the left tower structure 104 may be at the beginning stage of their growth and most of plants disposed on the right tower structure 102 may be at their maturity or ready for harvesting. Then, the right tower structure 102 may experience heavier plants weight than the plants weight imposed on the left tower structure 104. Alternatively or additionally, weight disparity may develop at particular location(s) within the same tower structure, for example, between the top portion and the bottom portion, at each level of the tracks based on the weight of plants grown, etc.

Using the example above, if the left tower 104 of the assembly line grow pod 100 has an event of concentrated supply of fluid, plants arranged on the left tower 104 may be at its maturity stage, which tends to have more weight. Then, the weight imposed on the left tower 104 may change by the weight of plants grown.

Referring to FIGS. 2 and 3, the ballast control system 210 monitors the balanced state of the assembly line grow pod 100. Upon detection of the weight disparity of the assembly line grow pod, the ballast control system 210 operates to move fluid to/from the fluid holding tanks 206 and ballast tanks 212 to ensure an appropriate balance within the assembly line grow pod 100. In other words, the ballast control system 210 uses water as ballast to maintain the balance state of the assembly line grow pod 100. As the assembly line grow pod 100 carry simultaneously a large amount of plants on the carts 104, the weight disparity resulting from the weight of plants at their maturity, occasional fluid concentration at a particular location, etc. may be corrected by moving the fluid from the particular location experiencing more weight without moving the plants, or other structures. Water to/from various portions of the assembly line grow pod 100 may be transported using the existing structures such as fluid tanks, water lines, vales, pumps, etc. As shown in FIG. 2, the ballast control system 210 is fluidly coupled via the water lines 110 to the various other components within the assembly line grow pod 110 for the purpose of directing ballast water therethrough. The ballast water may include water that is specifically used for ballast purposes, water containing certain additives or the like, waste fluid, or a combination of water and nutrients that can be provided to seeds or plants.

FIG. 3 depicts one embodiment of the ballast control system 210 in greater detail. As shown in FIG. 3, the ballast control system 210 may include two ballast tanks 212 and a ballast controller 214. In other embodiments, the ballast control system 210 may include one ballast tank 212, or three or more ballast tanks 212 based on the amount of water supply in need. It should be noted that the ballast tank 212 is different from the fluid holding tanks 206 as shown in FIG. 2. The fluid holding tanks 206 contain the fluid for watering plants and seeds in the assembly line grow pod 100 and for other purpose such as cleaning the carts and trays. The ballast tank 212 contains ballast water (or other fluid) for maintaining the balanced state of the assembly line grow pod 100. The fluid may be flowing into and out of the ballast tank 212 to maintain the balanced state of the assembly line grow pod 100, as discussed in detail below.

Each one of the ballast tanks 212 may be configured to hold ballast water therein, which is distributed via the water lines 110 fluidly coupled to the ballast tanks 212 as needed. While two of the ballast tanks 212 are depicted in FIG. 3, it should be understood that the number of the ballast tanks 212 is not limited. In addition, the size and location of the ballast tanks 212 is not limited by the embodiment shown in FIG. 3. In other embodiments, the ballast tanks 212 may be any size and positioned at any location within the assembly line grow pod 100 (FIG. 1). For example, the ballast tanks 212 may be sized so as to be able to hold a volume of ballast water that is sufficient to balance the assembly line grow pod 100, as described herein.

The ballast controller 214 controls the flow of the ballast water from the ballast tanks 212 to the various portions of the assembly line grow pod 100, as shown in FIG. 1. In one embodiment, the ballast controller 214 may transmit signals to one or more ballast valves 216 (FIG. 3) to open or close as appropriate. Alternatively or additionally, the ballast controller 214 further transmits signals to the pumps 109 shown in FIG. 2 to cause the ballast water to flow out of the ballast tanks 212 into the various portions of the assembly line grow pod 100 (FIG. 1). The flow of the ballast water, according to the control by the ballast controller 214, occurs when ballast water is desired to balance the various portions of the assembly line grow pod.

In other embodiments, the ballast controller 214 may transmit signals to the ballast valves 216 to open or close as appropriate and/or the pumps 109 (FIG. 2) to cause the ballast water to flow into the ballast tanks 212 from the various portions of the assembly line grow pod 100 (FIG. 1). The return flow of ballast water into the ballast tanks 212 occurs when ballast water is not necessary or desired to balance the various portions of the assembly line grow pod.

The ballast controller 214 may be communicatively coupled to various components of the assembly line grow pod 100 (FIG. 1). The ballast controller 214 can determine whether ballast water is needed, determine where ballast water is needed, determine how the ballast water should be delivered (i.e., the route taken to get to the areas in need of ballast water), transmit control signals, receive feedback signals, and/or the like.

Figure 4:
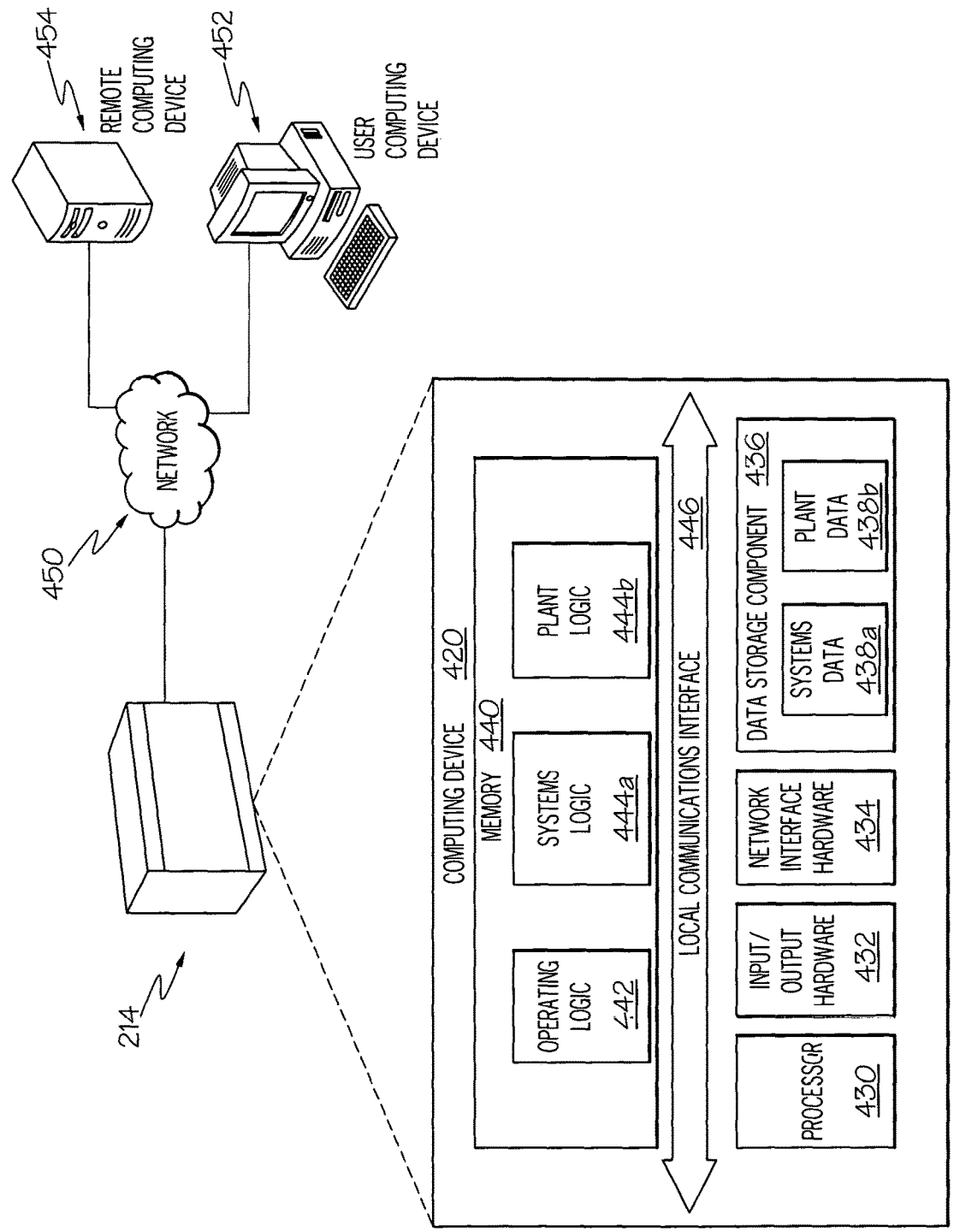
FIG. 4 depicts an illustrative computing environment within a ballast controller according to one or more embodiments shown and described herein.

FIG. 4 depicts one embodiment of various internal components of the illustrative ballast controller 214 that allow the ballast controller 214 to function as described above. In some embodiments, such internal components may generally be part of a computing environment. As illustrated in FIG. 4, the ballast controller 214 may include a computing device 420. The computing device 420 includes a processor 430, input/output hardware 432, the network interface hardware 434, a data storage component 436 (which stores systems data 438a, plant data 438b, and/or other data), and the memory component 440. The memory component 440 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the computing device 420. Alternatively, these non-transitory computer-readable mediums may reside external to the computing device 420.

The memory component 440 may store operating logic 442, systems logic 444a, and plant logic 444b. In some embodiments, the systems logic 444a and the plant logic 444b may each include a plurality of different pieces of logic. Each piece of logic may be embodied as a computer program, firmware, and/or hardware, as an example. As described in more detail below, the systems logic 444a may monitor and control operations of the ballast controller 214. The plant logic 444b may be configured to determine and/or receive a recipe for plant growth and may facilitate implementation of the recipe via the systems logic 444a. The recipe for plant growth includes information relating to growth of plants such as watering and nutrient needs, lighting needs, any other environmental requirements relevant to the growth of particular plants.

The operating logic 442 may include an operating system and/or other software for managing components of the computing device 420. As also discussed above, systems logic 444a and the plant logic 444b may reside in the memory component 440 and may be configured to perform the functionality as described herein.

It should be understood that while the components in FIG. 4 are illustrated as residing within the computing device 420, this is merely an example. In other embodiments, one or more of the components may reside external to the computing device 420. It should also be understood that, while the computing device 420 is illustrated as a single device, this is also merely an example. In further other embodiments, the systems logic 444a and the plant logic 444b may reside on different computing devices. As an example, one or more of the functionalities and/or components described herein may be provided by a user computing device and/or a remote computing device.

Additionally, while the computing device 420 is illustrated with the systems logic 444a and the plant logic 444b as separate logical components, the embodiment illustrated in FIG. 4 is not limited thereto. In some embodiments, a single piece of logic (and/or or several linked modules) may cause the computing device 420 to provide the described functionality.

In some embodiments, the computing device 420 further includes a local interface 446 as shown in FIG. 4 and may be implemented as a bus or other communication interface to facilitate communication among the components of the computing device 420. The processor 430 may include any processing component operable to receive and execute instructions (such as from a data storage component 436 and/or the memory component 440). The input/output hardware 432 may include and/or be configured to interface with microphones, speakers, a display, and/or other hardware.

The network interface hardware 434 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the computing device 420 and other devices external to the ballast controller 214.

Additionally, the ballast controller 214 is coupled to a network 450. The network 450 may include the internet or other wide area network, a local network, such as a local area network, a near field network, such as Bluetooth or a near field communication (NFC) network. The network 450 is also coupled to a user computing device 452 and/or a remote computing device 454. The user computing device 452 may include a personal computer, laptop, mobile device, tablet, server, etc. and may be utilized as an interface with a user. As an example, a user may send a recipe to the computing device 420 that is at least partially implemented by the ballast controller 214. Another example may include the ballast controller 214 sending notifications to a user of the user computing device 452 (e.g., to notify the user of a location or use of ballast water).

Similarly, the remote computing device 454 may include a server, personal computer, tablet, mobile device, etc. and may be utilized for machine to machine communications. As an example, if the ballast controller 214 determines a type of seed being used (and/or other information, such as ambient conditions), the computing device 440 may communicate with the remote computing device 454 to retrieve a previously stored recipe for those conditions. As such, some embodiments may utilize an application program interface (API) to facilitate this or other computer-to-computer communications.

Figure 5:
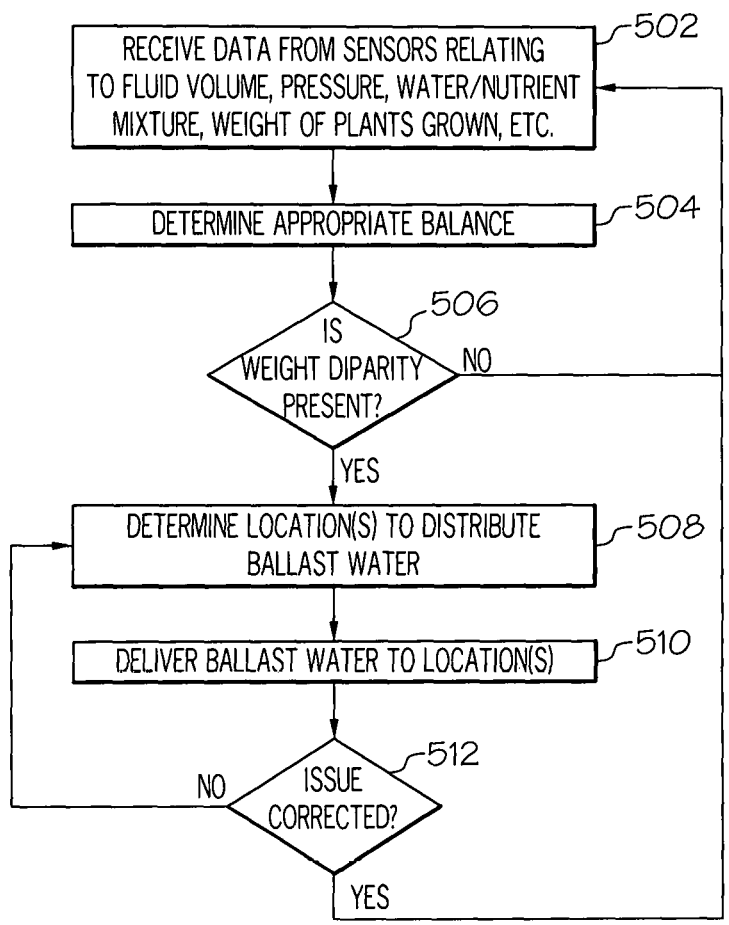
FIG. 5 depicts a flow diagram of an illustrative method of maintaining a balance of water throughout various portions of an assembly line grow pod according to one or more embodiments shown and described herein.

FIG. 5 depicts an illustrative method of maintaining a balance of water throughout the assembly line grow pod according to various embodiments. As shown in FIG. 5, the method includes receiving data from various sensors such as the pressure sensors 220, 230 and/or other components in the assembly line grow pod in block 502. The data that is received may generally pertain to various features of the assembly line grow pod 100 that may allow the ballast controller 214 to determine whether ballast water is needed and/or where ballast water is needed within the assembly line grow pod 100. The data that is received may also include information regarding the present location of ballast water (e.g., in the ballast tanks and/or in other portions of the assembly line grow pod). Illustrative examples of such data include, but are not limited to, fluid volume, fluid pressure, a current water/nutrient mixture concentration, an identification of areas containing water, plants, seeds, other fluids, ballast water, and the like. In addition, the method includes receiving data regarding the weight of plants grown, as discussed above.

In block 504, an appropriate balance of the assembly line grow pod may be determined. Such a determination may generally include determining a balance that minimizes potential damage, malfunctioning, and/or the like of the assembly line grow pod 100 and/or various components thereof. More specifically, in the embodiments, the data received from the sensors and/or the various components may include identification of areas containing water, fluid volume and fluid pressure.

Based on this set of information, the ballast controller 214 may determine that a particular location of the assembly line grow pod 100 experiences higher fluid volume and fluid pressure along with a volume of water that has been supplied. By way of one example, the ballast controller 214 may compare fluid volume and fluid pressure in the left tower structure 104 and the right tower structure 102. The ballast controller 214 may have data pre-stored in the memory 440 which indicates a threshold disparity value in the fluid volume and fluid pressure between the left and right tower structures 104, 102. The ballast controller 214 may compare a current weight disparity in the fluid volume and the fluid pressure between the left and the right tower structures 104 and 102 with the pre-stored threshold value and determine that the balanced state of the assembly line grow pod 100 needs to be maintained when the current disparity exceeds the threshold disparity value.

In some embodiments, the pressure sensors 220 and 230 arranged in the fluid holding tanks 206a and 206c detect information relating to pressure, fluid volume, water/nutrient mixture, etc. In other embodiments, more pressure sensors may be arranged at the multiple suitable locations such as the fluid distribution manifold, the water tap, etc. The master controller 106 may estimate weight of plants based on the amount of seeds on the carts 104, the amount of dosage supply to the seeds and the plants based on the master recipe, and weight measured at the harvesting station. The master controller 106 and the ballast controller 214 may monitor and determine weight disparity based on the data from the pressure sensors and the data relating to the weight of plant grown. In some embodiments, the master controller 106 further determines the location of the fluid by using cart identifiers, various sensors such as weight sensors, proximity sensors, image sensors, etc. In other words, the master controller 106 is able to determine how much fluid has been supplied at a particular location and the weight of plants grown at that particular location. This information may be provided to the ballast controller 214 such that the ballast controller 214 may monitor and determine whether there is a weight disparity that needs to be addressed by sending or pulling ballast water from that particular location to the ballast tank, or vice versa.

In block 506, a determination is made as to whether the assembly line grow pod 100 or a component thereof has a weight disparity based on the appropriate balance determined in block 504. As discussed above, in some embodiments, the ballast controller 214 determines the balanced state of the assembly line grow pod 100 based on a weight disparity. The weight disparity may develop between the left tower 104 and the right tower 102, or different locations within the same tower of the assembly line grow pod 100, such as between the upper tracks and the lower tracks, between front and rear sides of the same tower, between left and right sides of the same tower, etc. As discussed above, the weight disparity may result from concentration of fluid supply to a particular location and the weight of plants grown. The population of plants and the growth state of plants vary, and the carts 104 are moving through the assembly line grow pod. Thus, the amount and location of the fluid supply vary as well as the weight of plants based on their growth progress.

As discussed above, the master controller 106 is able to determine how much fluid has been supplied at a particular location and the weight of plants grown at that particular location. This information may be provided to the ballast controller 214. The ballast controller 214 may monitor and determine whether there is a weight disparity that needs to be corrected by sending or pulling ballast water from that particular location to the ballast tank, or vice versa.

If the assembly line grow pod 100 and/or component thereof is balanced, the process may return to block 502 for receiving further data and making further determinations. Monitoring and further determining a balanced state of the assembly line grow pod 100 may be repeated on a predetermined cycle such as multiple times per day, on a daily basis, or more frequently. The cycle may be determined based on multiple factors such as a frequency of watering, a number of plants and seeds in growing process, a number of plants in harvesting process, the amount of water remaining in the fluid holding tanks 206, the amount of ballast water contained in the ballast tank 212, capacity and delivery time of the water lines 110 etc.

If the assembly line grow pod and/or component thereof may experience a weight disparity, the process may proceed to block 508. In block 508, a determination is made as to where ballast water should be distributed in order to result in a balanced assembly line grow pod and/or component thereof. As discussed above in connection with block 504, the ballast controller 214 receives information relating to fluid volume, fluid pressure, a current water/nutrient mixture concentration, an identification of areas containing water, plants, seeds, other fluids, ballast water, and the like from various components of the assembly line grow pod 100 and/or sensor. If the ballast controller 214 detects the fluid volume and/or fluid pressure disparity between the left tower structure 102 and the right tower structure 104, the ballast controller 214 controls the ballast water to be directed to one of the left and right tower structures 102, 104 which has lower fluid volume and/or lower fluid pressure. In other embodiments, if the ballast controller 214 receives the data indicative of higher fluid volume and/or fluid pressure at a particular location in the assembly line grow pod 100, the ballast controller 214 may control the ballast water to be sent to the particular location in order to balance out the higher fluid volume and/or fluid pressure. The particular location may include, for example, locations within the same tower of the assembly line grow pod 100, such as between the upper tracks and the lower tracks, between front and rear sides of the same tower, between left and right sides of the same tower, etc. The ballast controller 214 may receive the location information from the master controller 106, or alternatively, identify the location of the higher fluid volume and/or fluid pressure based on the location of the pressure sensors. Identifying the location of the higher fluid volume and/or fluid pressure may not be limited to a particular process. Once the location is identified, the ballast controller 214 may direct the ballast water to/from that location into/from the ballast tank 212.

In other embodiments, one of the fluid holding tanks 206 may experience higher fluid pressure and fluid volume. The ballast controller 214 may control the fluid from one of the fluid holding tanks 206 to flow out of such tank 206 to the ballast tank 212. Additionally, or alternatively, a particular location of the grow pod may experience high population of mature plants and the resulting weight surge. In this case, the ballast controller 214 may control the fluid supplied to that particular location to be pulled and flow into the ballast tank 212. The balanced state based on the weight of plants grown may be maintained by moving the fluid out of the affected location, instead of transporting plants, or other structures.

The ballast water is delivered accordingly in block 510 and a determination is made as to whether the balance issue has been corrected by the ballast water movement. If not, the process may repeat in block 508. If so, the process may repeat in block 502 for additional fluid movement that may be necessary as seeds/plants traverse the assembly line grow pod.

As illustrated above, various embodiments for using water as ballast in an assembly line grow pod are disclosed. These embodiments provide an ability to maintain balance within the assembly line grow pod. A system for controlling a balanced state of an assembly line grow pod includes a plurality of carts carrying plants, seeds, or both, a plurality of fluid holding tanks, pressure sensors, a ballast tank and a ballast controller. The plurality of fluid holding tanks is arranged in an assembly line grow pod and for supplying fluid to the plants and the seeds. The pressure sensors are arranged in association with the fluid holding tanks. The ballast tank is fluidly connected to the fluid holding tanks and for holding ballast water. The ballast controller is coupled to the ballast tank and operable to determine a balanced state of the assembly line grow pod. The ballast controller is operable to (i) receive from the pressure sensors a first set of data indicative of the weight of the fluid, (ii) receive a second set of data indicative of weight of plants grown, (iii) determine the balanced state of the assembly line grow pod, based on the first set of data and the second set of data, at a selected location of the assembly line grow pod, and (iv) maintain the balanced state of the assembly line grow pod by moving a flow of the ballast water between the ballast tank and the selected location.

In another embodiment, the selected location of the assembly line grow pod comprises a first tower structure and a second tower structure. The ballast controller is operable to determine a weight disparity between the first tower structure and the second structure. The ballast controller is further operable to direct the fluid between the fluid holding tanks and the ballast tank as the ballast water.

In another embodiment, the ballast controller is further operable to: upon determination that a weight disparity between the first tower structure and the second tower structure exceeds a predetermined threshold, maintain the balanced state of the assembly line grow pod by moving the flow of the ballast water between the first tower structure and the second tower structure via the ballast tank.

In another embodiment, the ballast controller is further operable to: upon determination that a weight disparity between the first tower structure and the second tower structure exceeds a predetermined threshold, maintain the balanced state of the assembly line grow pod by moving the flow of the ballast water between the first tower structure and the second tower structure via the fluid holding tank.

An assembly line grow pod system includes a grow pod structure, a first fluid holding tank, a second fluid holding tank, and a ballast control system. The grow pod structure includes a first tower structure and a second tower structure and supporting a plurality of carts carrying plants, seeds, or both. The first fluid holding tank is associated with the first tower structure and contains fluid to be supplied to the plants and the seeds arranged in the first tower structure. The second fluid holding tank is associated with the second tower structure and containing fluid to be supplied to the plants and the seeds arranged in the second tower structure.

The ballast control system is communicatively coupled to the first fluid holding tank and the second fluid holding tank. The ballast control system includes a ballast controller, a first ballast tank communicatively coupled to the ballast controller, and a second ballast tank communicatively coupled to the ballast controller. The ballast controller is operable to (i) determine a balanced state of the first tower structure and the second tower structure based on first weight information including weight of the first fluid holding tank and weight of the plants arranged in the first tower structure and based on second weight information including weight of the second fluid holding tank and weight of the plants arranged in the second tower structure, and (ii) maintain the balanced state of the assembly line grow pod by directing a flow of fluid between the first fluid holding tank and the first ballast tank, a flow of fluid between the second fluid holding tank and the second ballast tank, or both.

In another embodiment, the ballast controller is operable to determine a weight disparity between the first tower structure and the second structure. In response to the balanced state of the first tower structure, the ballast controller is operable to transmit a first signal to open or close a ballast valve to cause the ballast water to flow in, or out of the first ballast tank. In response to the balanced state of the first tower structure, the ballast controller is operable to transmit a second signal to a pump to cause the ballast water to flow in, or out of the first ballast tank.

In another embodiment, the assembly line grow pod system further includes a master controller including a processor and a memory for storing a set of instructions that dictate an amount of fluid supply customized to the plants and the seeds in the grow pod structure. The memory further stores a predetermined program, upon execution by the processor, which determines the weight of the plants arranged in the first tower structure based on the fluid supply customized to the plants arranged in the first tower structure, initial weight of the carts and weight of the carts at the time of harvesting plants. The assembly line grow pod system further includes a first pressure sensor arranged in the first fluid holding tank and a second pressure sensor arranged in the second fluid holding tank. The ballast controller is operable to receive from the first and the second pressure sensors data indicative of fluid volume, fluid pressure and a current mixture of water and nutrient mixture concentration of the first fluid holding tank and the second fluid holding tank.

A method for controlling a balanced state of an assembly line grow pod is provided. A group of sensors including a pressure sensor and a weight sensor is arranged at a plurality of different locations of an assembly line grow pod. A first set of data indicative of weight of fluid supplied to plants supported in an assembly line grow pod is generated. A second set of data indicative of weight of plants grown is generated. Based on the first set of data and the second set of data, a weight disparity at a selected location of the assembly line grow pod is determined. Upon determination that the weight disparity exceeds a predetermined threshold, the balanced state of the assembly line grow pod is maintained by moving ballast water to reduce the weight disparity.

In another embodiment, the balanced state of the assembly line grow pod is maintained by moving the ballast water is moved from the selected location to a ballast tank. In another embodiment, the balanced state of the assembly line grow pod is maintained by moving the ballast water to the selected location from a ballast tank. In another embodiment, the weight of fluid and the weight of plants grown are determined at a first location. The weight of fluid and the weight of plants grown are determined at a second location. The weight disparity is determined between the first location and the second location.

In another embodiment, the balanced state of the assembly line grow pod is maintained by moving from the first location to the second location. The balanced state of the assembly line grow pod is maintained by moving the ballast water from a ballast tank to the second location.

Accordingly, some embodiments may include an assembly line grow pod comprising a ballast control system having one or more ballast tanks and a ballast controller, wherein the ballast controller monitors one or more conditions of the assembly line grow pod, determines whether the assembly line grow pod is balanced, and ballast water is used to or from the one or more ballast tanks to maintain a balance in the assembly line grow pod.

As illustrated above, various embodiments for monitoring and maintaining a balanced state of the assembly line grow pod are disclosed. These embodiments provide an ability to monitor and maintain a balanced state of the assembly line grow pod at various levels, various components, and/or different structures. The balanced state of the assembly line grow pod may be monitored and maintained to prevent potential damage and potential malfunctioning of components, structures, and the entire assembly line grow pod. In the embodiments described above, the ballast water is used to maintain the balanced state. The ballast water is contained at the ballast water tank and used to maintain the balanced state. Using the ballast water as a balancing medium may provide a convenient and simple mechanism to the assembly line grow pod. For example, the ballast water may be directed and distribute by using the existing components such as the valves, the pumps, the water lines, etc. for maintaining the balanced state. Furthermore, using the ballast water is well suited to the structure and functions of the assembly line grow pod that primarily involves watering plants and seeds.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for maintaining a balanced state of an assembly line grow pod using ballast water. It should also be understood that these embodiments are merely exemplary and are not intended to limit the scope of this disclosure.

What is claimed is:

1. A system for controlling a balanced state of an assembly line grow pod, comprising:
    a plurality of carts carrying plants, seeds, or both;
    a plurality of fluid holding tanks arranged in an assembly line grow pod and for supplying fluid to the plants and the seeds;
    pressure sensors arranged in association with the fluid holding tanks;
    a ballast tank fluidly connected to the fluid holding tanks and for holding ballast water;
    a ballast controller coupled to the ballast tank and operable to determine a balanced state of the assembly line grow pod, wherein the ballast controller is operable to:
        receive from the pressure sensors a first set of data indicative of the weight of the fluid;
        receive a second set of data indicative of weight of plants grown;

determine the balanced state of the assembly line grow pod, based on the first set of data and the second set of data, at a selected location of the assembly line grow pod; and maintain the balanced state of the assembly line grow pod by moving a flow of the ballast water between the ballast tank and the selected location.

2. The system of claim 1, wherein the selected location of the assembly line grow pod comprises a first tower structure and a second tower structure.

3. The system of claim 2, wherein the ballast controller is operable to determine a weight disparity between the first tower structure and the second structure.

4. The system of claim 2, wherein the ballast controller is further operable to direct the fluid between the fluid holding tanks and the ballast tank as the ballast water.

5. The system of claim 4, wherein the ballast controller is further operable to:

upon determination that a weight disparity between the first tower structure and the second tower structure exceeds a predetermined threshold, maintain the balanced state of the assembly line grow pod by moving the flow of the ballast water between the first tower structure and the second tower structure via the ballast tank.

6. The system of claim 5, wherein the ballast controller is further operable to:

upon determination that a weight disparity between the first tower structure and the second tower structure exceeds a predetermined threshold, maintain the balanced state of the assembly line grow pod by moving the flow of the ballast water between the first tower structure and the second tower structure via the fluid holding tank.

7. An assembly line grow pod system, comprising:

a grow pod structure including a first tower structure and a second tower structure and supporting a plurality of carts carrying plants, seeds, or both; and a first fluid holding tank associated with the first tower structure and containing fluid to be supplied to the plants and the seeds arranged in the first tower structure;

a second fluid holding tank associated with the second tower structure and containing fluid to be supplied to the plants and the seeds arranged in the second tower structure;

a ballast control system communicatively coupled to the first fluid holding tank and the second fluid holding tank and comprising:

a ballast controller;

a first ballast tank communicatively coupled to the ballast controller; and a second ballast tank communicatively coupled to the ballast controller;

wherein the ballast controller is operable to:

determine a balanced state of the first tower structure and the second tower structure based on first weight information including weight of the first fluid holding tank and weight of the plants arranged in the first tower structure and based on second weight information including weight of the second fluid holding tank and weight of the plants arranged in the second tower structure; and maintain the balanced state of the first tower structure and the second tower structure by directing a flow of fluid between the first fluid holding tank and the first ballast tank, a flow of fluid between the second fluid holding tank and the second ballast tank, or both.

8. The system of claim 7, wherein the ballast controller is operable to determine a weight disparity between the first tower structure and the second structure.

9. The system of claim 7, wherein in response to the balanced state of the first tower structure, the ballast controller is operable to transmit a first signal to open or close a ballast valve to cause the ballast water to flow in, or out of the first ballast tank.

10. The system of claim 7, wherein in response to the balanced state of the first tower structure, the ballast controller is operable to transmit a second signal to a pump to cause the ballast water to flow in, or out of the first ballast tank.

11. The system of claim 7, further comprising a master controller comprising a processor and a memory for storing a set of instructions that dictate an amount of fluid supply customized to the plants and the seeds in the grow pod structure.

12. The system of claim 11, wherein the memory further stores a predetermined program, upon execution by the processor, which determines the weight of the plants arranged in the first tower structure based on the fluid supply customized to the plants arranged in the first tower structure, initial weight of the carts and weight of the carts at the time of harvesting plants.

13. The system of claim 7, further comprising a first pressure sensor arranged in the first fluid holding tank and a second pressure sensor arranged in the second fluid holding tank.

14. The system of claim 13, wherein the ballast controller is operable to receive, from the first pressure sensor and the second pressure sensor, data indicative of fluid volume, fluid pressure and a current mixture of water and nutrient mixture concentration of the first fluid holding tank and the second fluid holding tank.

15. A method for controlling a balanced state of an assembly line grow pod, comprising:

arranging a group of sensors including a pressure sensor and a weight sensor at a plurality of different locations of an assembly line grow pod;

generating a first set of data indicative of weight of fluid supplied to plants supported in an assembly line grow pod;

generating a second set of data indicative of weight of plants grown;

determining, based on the first set of data and the second set of data, a weight disparity at a selected location of the assembly line grow pod; and upon determination that the weight disparity exceeds a predetermined threshold, maintaining the balanced state of the assembly line grow pod by moving ballast water to reduce the weight disparity.

16. The method of claim 15, wherein maintaining the balanced state further comprises maintaining the balanced state of the assembly line grow pod by moving the ballast water further comprises moving the ballast water from the selected location to a ballast tank.

17. The method of claim 15, wherein maintaining the balanced state further comprises maintaining the balanced state of the assembly line grow pod by moving the ballast water to the selected location from a ballast tank.

18. The method of claim 15, wherein determining the weight disparity further comprises:

determining the weight of fluid and the weight of plants grown at a first location;

determining the weight of fluid and the weight of plants grown at a second location; and determining the weight disparity between the first location and the second location.

19. The method of claim 18, wherein maintaining the balanced state further comprises maintaining the balanced state of the assembly line grow pod by moving the ballast water from the first location to the second location.

20. The method of claim 18, wherein maintaining the balanced state further comprises maintaining the balanced state of the assembly line grow pod by moving the ballast water from a ballast tank to the second location.

\* \* \* \* \*